(12) United States Patent
Wepener et al.

(10) Patent No.: US 6,479,624 B2
(45) Date of Patent: Nov. 12, 2002

(54) POLYMER SOLUTION PREHEATER AND METHOD FOR PREHEATING SUCH SOLUTIONS

(75) Inventors: Angelia M. Wepener, Wichita, KS (US); Felix A. Streiff, Humlikon (CH)

(73) Assignee: Koch-Glitch, Inc., Wichita, KS (US)

( * ) Notice: Subject to any disclaimer, the term of this patent is extended or adjusted under 35 U.S.C. 154(b) by 0 days.

(21) Appl. No.: 09/813,452

(22) Filed: Mar. 21, 2001

(65) Prior Publication Data
US 2001/0039329 A1 Nov. 8, 2001

Related U.S. Application Data
(60) Provisional application No. 60/190,990, filed on Mar. 21, 2000.

(51) Int. Cl.[7] .............................................. C08G 59/68
(52) U.S. Cl. ..................................................... 528/480
(58) Field of Search ................................ 528/480, 196; 165/163

(56) References Cited

U.S. PATENT DOCUMENTS
4,314,606 A   2/1982   Müller et al. ............... 165/163

FOREIGN PATENT DOCUMENTS
| AT | 303776 | 12/1972 | ............ F28D/1/04 |
| EP | 0 352 727 B1 | 1/1994 | |

Primary Examiner—Terressa M. Boykin
(74) Attorney, Agent, or Firm—Shook, Hardy & Bacon L.L.P.

(57) ABSTRACT

A polymer devolatilization preheater and a method for using the same to preheat a polymer/solvent solution. The preheater includes an elongated, upright hollow vessel defining a heating chamber having a upper and lower ends, and a longitudinal axis extending between the ends. An inlet for a polymer/solvent solution is located adjacent the upper end of the chamber and a molten polymer outlet is located adjacent the lower end of the chamber. A plurality of heating tube bundles are mounted in the chamber, each bundle including a plurality of elongated serpentine heating tubes which are each arranged in a configuration having a major axis which extends across the chamber in a direction transverse to the longitudinal axis of the vessel. The tubes are positioned such that the polymer/solvent solution comes into heat transferring contact with an outer surface thereof as the polymer/solvent solution flows along a path that extends from the polymer/solvent solution inlet to the polymer outlet. Each tube includes a plurality of curved tube portions and a plurality of linking tube portions which interconnect the curved tube portions. The tube portions of each tube are all arranged in common plane that is arranged in essential parallelism relative to the longitudinal axis of the vessel and the tube configuration is essentially rectangular so as to present a pair of opposite edges disposed in essential parallelism relative to the major axis of the tube configuration. The linking tube portions are elongated and arranged so as to extend transversely relative to said major axis and the linking tube portions of each tube are arranged in essential parallelism relative to one another.

31 Claims, 4 Drawing Sheets

POLYMER SOLUTION PREHEATER AND METHOD FOR PREHEATING SUCH SOLUTIONS

REFERENCE TO RELATED APPLICATION

Priority is claimed in the present application pursuant to 35 U.S.C. §119(e) from provisional application Ser. No. 60/190,990 filed Mar. 21, 2000, the entirety of the disclosure of which is hereby specifically incorporated herein by this specific reference thereto.

BACKGROUND OF THE INVENTION

1. Field of the Invention

The present invention relates to the processing of polymer solutions and in particular to process equipment and methodology for preheating polymer/solvent solutions and at least partially devolatilizing the same prior to the final vacuum devolatilization of the molten polymer in short residence time and at low pressure drop.

2. The State of the Prior Art

Preheaters for heating polymer solutions coming from a polymerization reactor prior to vacuum devolatilization are well known in the art. Prior art methodology often features the use of process equipment such as multi tube heat exchanger (MTHE) preheaters, with or without internals (mixing elements). However, such equipment, more often than not, is characterized by flow instabilities due to flashing polymer solution, large shell diameters and thick tube sheets leading to high cost, excessive heating at turndown conditions due to only one fixed heating zone, thermal expansion during burning out processes, and difficult maintenance and cleaning procedures. Other prior art preheating devices include specially designed finned tubes that are mounted directly in the devolatilization chamber. Such a device is described in European Patent Publication no. 0352 727 B1. However, such preheater devices are very expensive and require very large residence times, a process condition which often results in product degradation. Many prior art devices also are characterized by excessive pressure drop.

Furthermore, heat exchangers such as those described in U.S. Pat. No. 4,314,606 (SMR reactor) are known as reactor or coolers for polymers. The standard SMR design has a large liquid hold-up and therefore a large residence time. Due to the typical SMR layout, the service fluid flow must be low in order to keep the service fluid pressure drop in acceptable limits. If the standard SMR design were to ever be used as a polymer devol preheater, the residence time would be typically be 5 to 20 minutes which would reduce the polymer quality.

SUMMARY OF THE INVENTION

The present invention provides a polymer devolatilization preheater device and methodology which address the problems encountered during the use of prior art devices as described above. In particular, the invention provides a preheater and methodology whereby the cost of the equipment, pressure drop, residence time, poor temperature distribution and flow instability are all minimized. In accordance with the concepts and principles of the invention, the improved polymer devolatilization preheater comprises an elongated, upright hollow vessel defining a heating chamber having an upper end, a lower end, and a longitudinal axis extending between the ends. The vessel also includes an inlet for a polymer/solvent solution located adjacent to either the upper end or lower end of the chamber and a molten polymer outlet located adjacent to either the lower end or upper end of the chamber. The preheater of the invention further includes at least one heating tube bundle in the chamber.

The bundle may include at least one elongated serpentine heating tube arranged in a configuration having a major axis which extends across the chamber in a direction transverse to the longitudinal axis of the chamber. The tube is positioned such that the polymer/solvent solution descending in the chamber comes into heat transferring contact with an outer surface thereof as the polymer/solvent solution flows along a path that extends from the polymer/solvent solution inlet toward the polymer outlet. In accordance with the broad aspects of the invention, the tube desirably includes a plurality of curved tube portions. The tube also includes a plurality of linking tube portions which interconnect the curved tube portions.

The curved tube portions and/or the linking tube portions may be arranged in a common plane, and such plane may preferably be arranged in essential parallelism relative to the longitudinal axis of the chamber. Ideally, the outer spatial configuration of each tube may be essentially rectangular whereby to present a pair of opposite edges, each of which is disposed in essential parallelism relative to the major axis of the tube configuration.

In a particularly preferred form of the invention, the linking tube portions may be arranged in essential parallelism relative to one another, and the same may be elongated and arranged so as to extend transversely relative to the major axis of the tube configuration.

Desirably, the bundle may include at least two tubes, and such tubes may be arranged in respective adjacent parallel planes. Moreover, the tubes may have respective heating media inlets and outlets which project through a wall of the vessel. The tubes may preferably be arranged such that the heating media inlet of one of the tubes is adjacent the heating media outlet of the other tube, and vice versa. Thus, heating media introduced into the heating media inlets of horizontally adjacent tubes flows through the tubes in opposite directions. Even more desirably, the preheater may include at least two of the bundles in the chamber. One such bundle may be positioned above the other bundle. Ideally, the bundles may be oriented such that the major axes of the elongated serpentine heating tubes of one of the bundles are offset angularly of the longitudinal axis of the chamber relative to the major axes of the elongated serpentine heating tubes of another bundle.

In accordance with one preferred form of the invention, the vessel and thereby the chamber each have a rectangular, preferably square, horizontal cross-sectional configuration. Furthermore, the preheater of the invention may also include an inlet distributor located at the upper end of the chamber for evenly distributing the flow of polymer/solvent solution across an upper portion of an upper bundle and/or an outlet distributor located at the lower end of the chamber. Ideally, the outlet distributor may include a plurality of apertures for dividing the molten polymer into a multiplicity of strands as it leaves the chamber to increase the surface area of the molten polymer and thereby enhance the removal of solvent therefrom in the vacuum devolatilization chamber.

The invention further provides a method for preheating a polymer/solvent solution prior to introduction of the same into a vacuum devolatilization chamber. Such method may include the steps of introducing a polymer/solvent solution into the preheater discussed above through the polymer/solvent solution inlet thereof, heating the solution by allowing the same to descend through the chamber and come into contact with the outer surfaces of the elongated serpentine heating tubes, and recovering a heated, molten plastic at the molten polymer outlet of the preheater chamber. In accordance with another of its aspects, the invention may provide a method for preheating and devolatilizing a polymer/solvent solution which comprises introducing a polymer/solvent solution into the preheater through the polymer/solvent solution inlet thereof, heating the solution and at least devolatilizing the polymer by allowing the solution to descend through the preheater chamber and come into contact with the outer surfaces of the elongated serpentine heating tubes, and directing the heated and at least partially devolatilized polymer through the molten polymer outlet of the preheater and into a vacuum devolatilization chamber. Ideally, the molten polymer may be divided into a multiplicity of individual strands before the same is directed into the devolatilization chamber to increase the surface area of the polymer and enhance the devolatilization operation.

DETAILED DESCRIPTION OF PREFERRED EMBODIMENTS OF THE INVENTION

Figure 1:
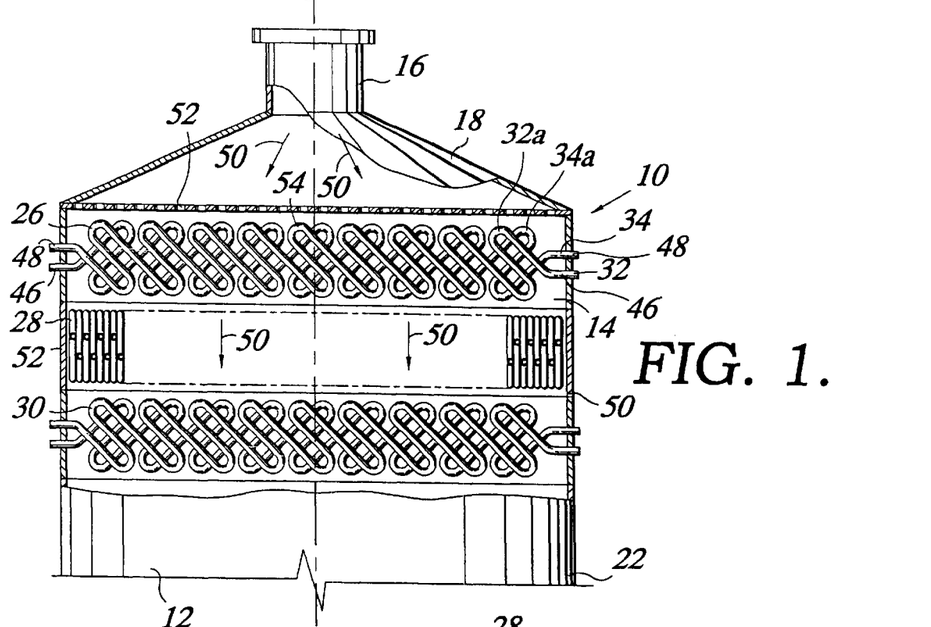
FIG. 1 is an elevational view, partly in cross-section, illustrating a preheater for a polymer/solvent solution which embodies the concepts and principles of the invention.

A polymer devolatilization preheater which embodies the principles and concepts of the invention is illustrated in FIG. 1 of the drawings, where it is identified broadly by the reference numeral 10. Preheater 10 includes a elongated, upright hollow vessel 12 which may have a generally rectangular horizontal cross-sectional configuration providing a heating chamber 14 which also may have a generally rectangular horizontal cross-sectional configuration.

Preheater 10 is provided with an inlet 16 for a polymer/solvent solution disposed at the upper end 18 of the chamber 14 and a molten polymer outlet 20 (see FIG. 3) disposed at the lower end 22 of the chamber 14. As can be seen, vessel 12 and chamber 14 share a longitudinal axis 24 that extends between the ends 18, 22.

Preheater 10 also includes a plurality of vertically serially arranged heating tube bundles 26,28 and 30 mounted within chamber 14. Although in the embodiment illustrated in the drawings, three such bundles are included, it will be appreciated by those skilled in the art that the actual number may vary from one to five or more, depending upon the necessities of a given application. Except for orientation, which will be explained hereinafter, each of the bundles 26,28 and 30 is essentially the same. Accordingly, for convenience, only bundle 26 will be described herein.

Figure 4:
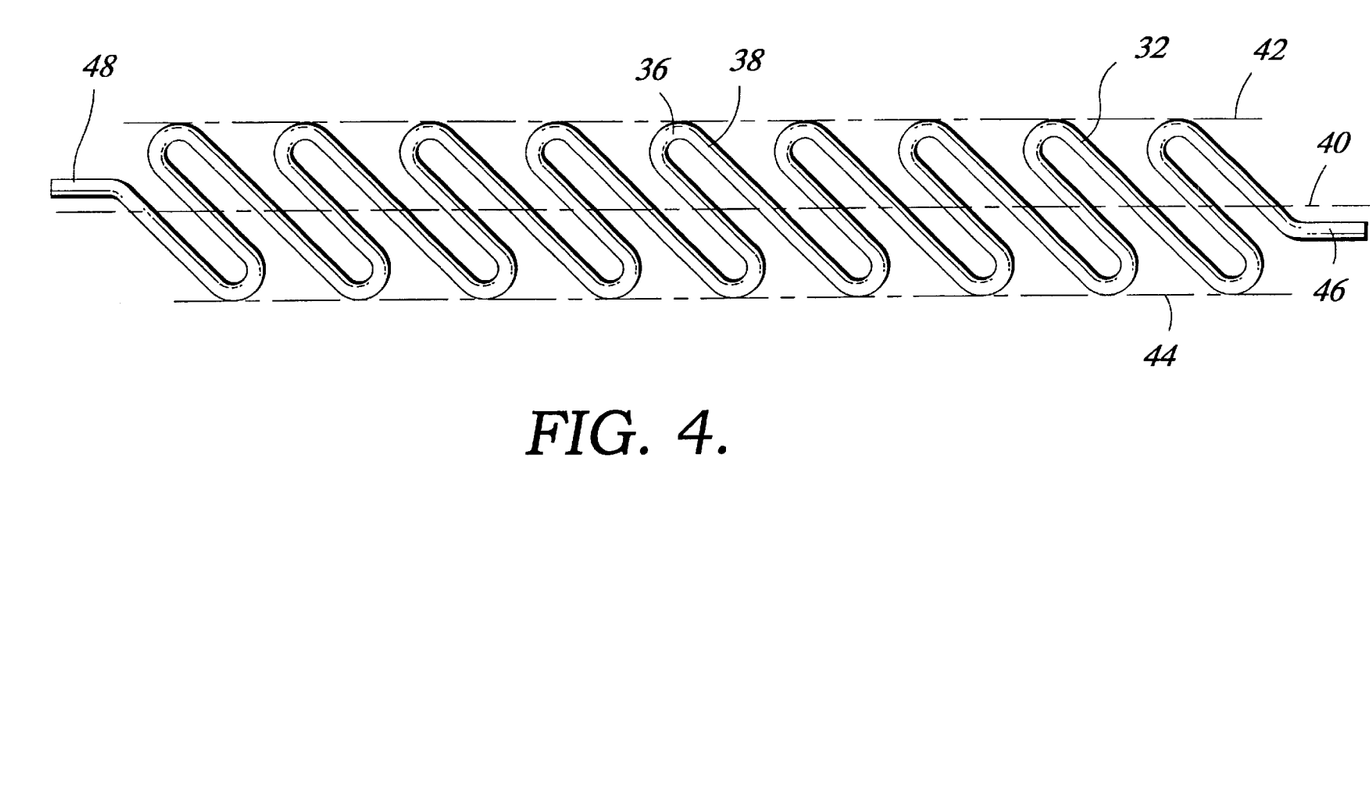
FIG. 4 is an enlarged elevational view of a single elongated serpentine heating tube which is a component of the preheater of FIG. 1.

Bundle 26 includes a plurality of elongated serpentine heating tubes 32 and 34. These tubes 32 and 34 are essentially identical except for orientation which will be explained hereinafter. Accordingly, only tube 32 will be described in detail herein. As can be seen in FIG. 4, tube 32 is made up of a plurality of curved, elbow or u-shaped tube portions 36 and a plurality of elongated, essentially straight linking tube portions 38 which interconnect the curved portions 36 as shown. Portions 36,38 are arranged to provide tube 32 with a generally rectangular configuration having a major axis 40 which extends across chamber 14 in a direction transverse to longitudinal axis 24. (See FIG. 1). The generally rectangular outer spatial configuration of tube 32 presents a pair of opposite edges 42, 44 which are each preferably disposed in essential parallelism relative to the major axis 40 of tube 32.

Figure 2:
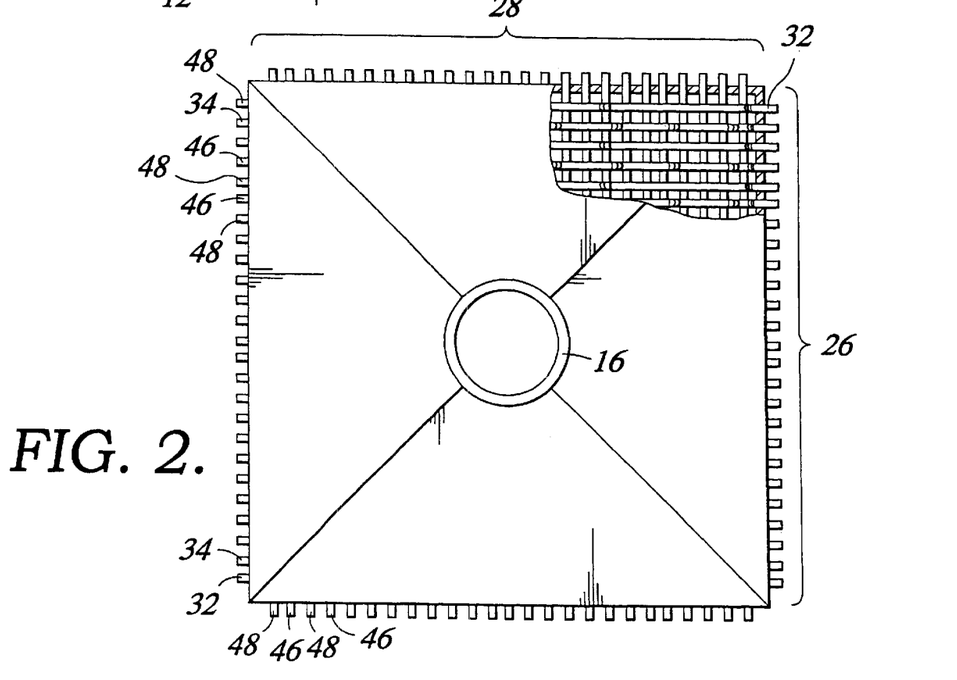
FIG. 2 is a top plan view, partly in cross-section, of the preheater of FIG. 1.

With further reference to FIG. 4, it can be seen that linking tube portions 38 are elongated and arranged so as to extend transversely relative to major axis 40 in essential parallelism relative to one another. The curved tube portions 36 and linking tube portions 38 of each tube 32 are preferably all arranged in a common plane as shown in FIG. 4. And as can be seen from FIG. 1, such respective common planes of the several tubes 32, 34 are arranged in essential parallelism relative to longitudinal axis 24. This is true for the planes of each of the tubes 32, 34 which make up each of the bundles 26, 28 and 30 of the heater 10. Thus, with particular reference to FIG. 2, it can be seen that each of the tubes 32 of each of the bundles 26, 28 and 30 is arranged in a plane that is adjacent to a parallel plane containing a tube 34, and vice versa.

As mentioned above, tubes 32 and 34 are identical except for their individual orientations. Thus, tubes 32 and 34 have respective heating media inlets 46 and heating media outlets 48 which project through respective walls 50, 52 of vessel 12. The tubes 32 and 34 are arranged such that the heating media inlet 46 of one of the tubes is adjacent the heating media outlet 48 of the tube in an adjacent plane and vice versa, whereby heating media introduced into the heating media inlets 46 of tubes 32 flows through the respective bundle in the opposite direction to the heating media introduced into the heating media inlets 46 of tubes 34, and vice versa. Those skilled in the art will be able to fashion suitable manifolds to accommodate service fluid flows from left to right and front to back as well as from right to left and back to front, alternatively, in order to minimize any temperature distribution in the cross section of the preheater chamber.

With reference to FIG. 1, it can be seen that the tubes 32,34 are positioned in chamber 14 such that the polymer/solvent solution entering the vessel 12 via inlet 16 will descend through chamber 14 and come into heat transferring contact with the outer surfaces 32a, 34a of the tubes 32, 34 as the polymer/solvent solution flows along a path shown by the arrows 50 that extends generally along longitudinal axis 24 from polymer/solvent solution inlet 16 and toward polymer outlet 20.

As can be seen viewing FIG. 1, bundles 26, 28 and 30 are serially arranged along axis 24 and the same are disposed one above the other. These bundles are also oriented such that the major axes 40 of the elongated serpentine heating tubes 32, 34 of bundle 28 are offset angularly of axis 24 relative to the major axes 40 of the elongated serpentine heating tubes 32, 34 of bundles 26 and 30. With this arrangement, separate control of service side flow and temperature is facilitated. That is to say, each of the bundles 26, 28 and 30 may be provided with a separately controlled flow of heating media. With this feature of dividing the preheater into individual heating packages, the service fluid velocity and flow path may be controlled in such a manner that the service side pressure drop is no greater than about 3 bar.

Desirably, preheater 10 may include an inlet distributor 52 located at upper end 18 of the chamber 14 for evenly distributing the flow of the polymer/solvent solution across an upper portion 54 of bundle 26. To ensure good distribution, the distributor may take the form of an orifice plate with at least the same pressure drop as the heater bundle. This feature may be particularly useful in the event that the combined low pressure drop through the chamber and the flashing of solvent situation might result in non-uniform flow distribution in the heater.

Figure 3:
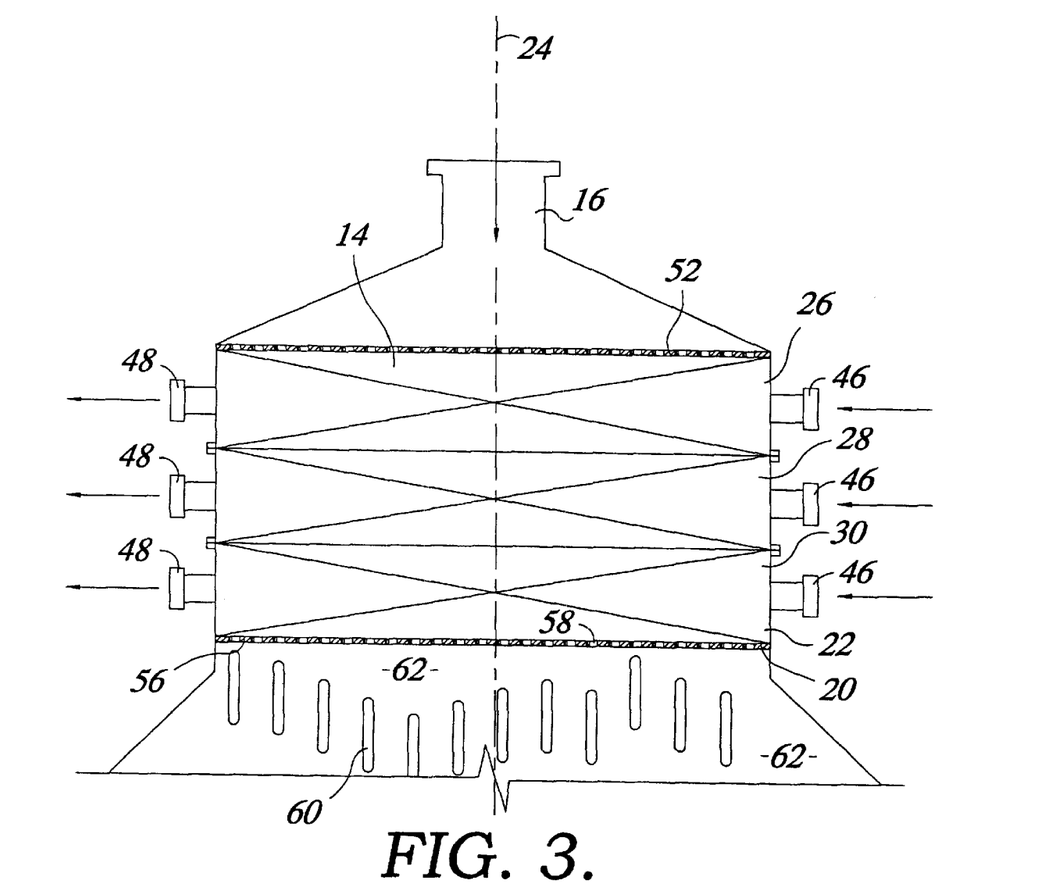
FIG. 3 is a schematic view of the preheater and associated process equipment to illustrate the methodology of the invention.

Preheater 10 may also include an outlet distributor 56 located at lower end 22 of the chamber 14. (See FIG. 3) Desirably, outlet distributor 56 may include a plurality of apertures 58 for dividing the molten polymer into a multiplicity of strands 60 as the same leaves chamber 14 to fall into a vacuum devolatization chamber 62 positioned beneath preheater 10 as can be seen in FIG. 3. In order to ensure stable operation, distribution 56 may desirably provide a pressure drop of up to about 0.2 bar or so.

In accordance with the invention, the tubes 32, 34 may preferably have an outer diameter of 13.5 mm and smaller. Typically, 8 mm tubes may be used in a large vessel having a diameter of 500 mm or less. The configuration of the tubes may desirably be such that the distance between edges 42 and 44 is approximately within the range of from about 100 to 300 mm. As described above, the tubes 32, 34 run from one side to the other across the chamber 14, and ideally no return is provided in order to keep the service side pressure drop below 4 bar. This low pressure drop in combination with a residence time for the polymer in the chamber of less than 1 minute is desirable to facilitate early flashing during heating, a factor that is responsible as shown by practical experience for producing high quality polymer with a narrow molecular weight distribution and no degradation.

Figure 5:
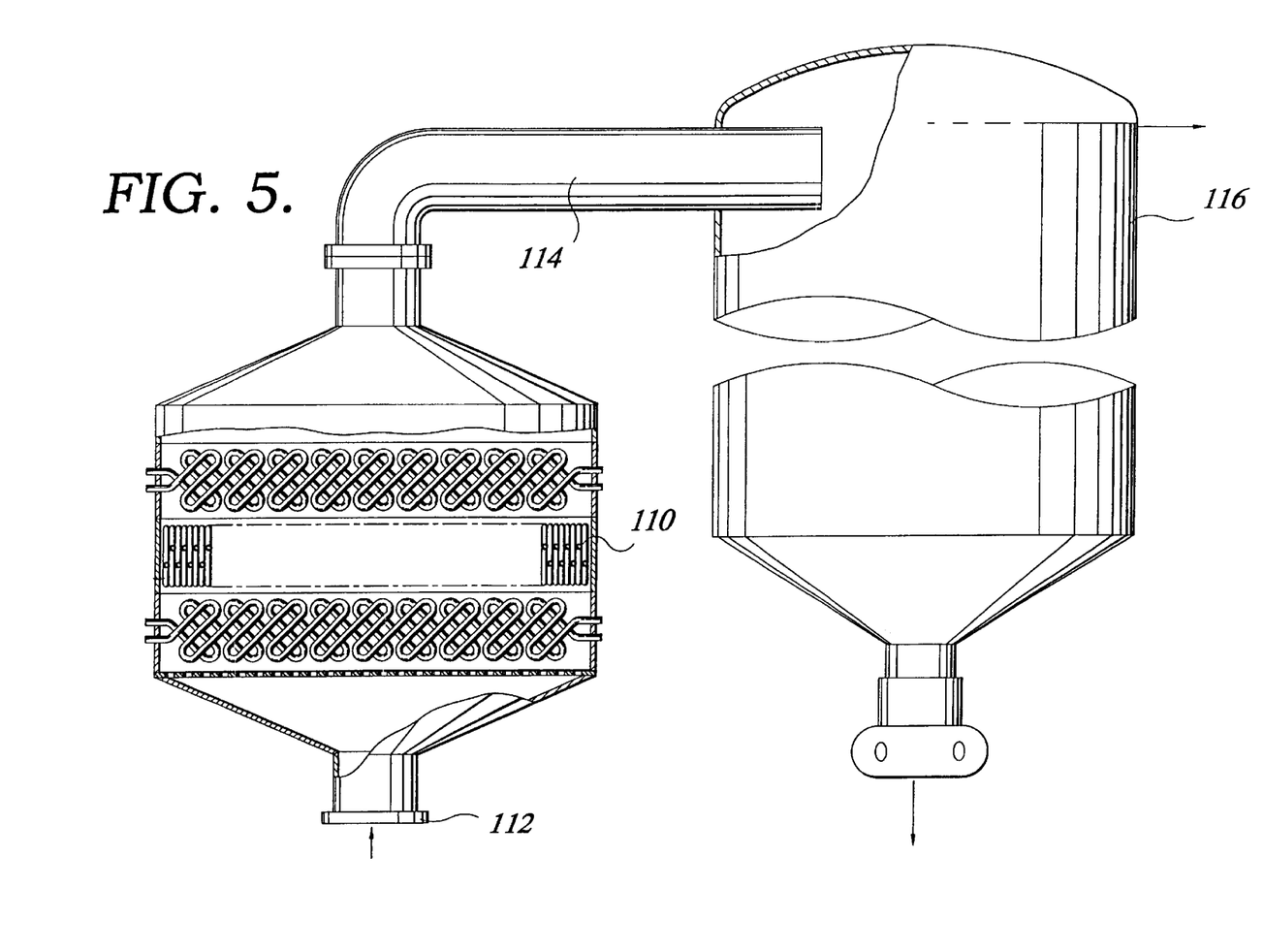
FIG. 5 is a schematic elevational view of an alternative preheater wherein the polymer/solvent solution is introduced at the bottom and the molten polymer leaves at the top.

The preheater described above is arranged for down flow operation. However, since disengaging vapors tend to flow upwards, in some instances upward flow of the polymer/solvent solution may be desirable. In such a case, the molten polymer may be removed from the chamber laterally via a sparger tube or the like and introduced into a vacuum devolatization chamber mounted on the upper side of the vessel. This configuration is illustrated schematically in FIG. 5, where the preheater is identified by the reference numeral 110, the polymer/solvent inlet by the reference numeral 112, the molten polymer outlet by the reference numeral 114 and the devolatization chamber by the reference numeral 116.

As an alternative arrangment, the preheater of the invention might conceivably be installed inside the vacuum devolatization chamber. In such a case, the preheater may desirably be equipped with an aid for vapor disengagement.

As described above, the vessel 12 is rectangular and preferably square. As will be appreciated by those skilled in the art, the heating bundles and tubes of the invention might also be installed in a round shell. In such a case, individual serpentine tubes having different lengths, as necessitated by the round shape, might be needed in order to fill the complete cross section. In this case, the flow through the individual tubes may be controlled by orifices in the tubes as required in order to control the respective flow rates in each tube.

The operation of the preheater of the invention is explained with reference to FIG. 3. In FIG. 3, the bundles 26, 28 and 30, the service fluid inlets 46 and the service fluid outlets 48 are shown schematically. In operation, a polymer/solvent solution containing from about 20,000 to 30,000 lbs per hour of a styrene acrylonitrile polymer in a hexane solvent solution is introduced into the preheater through inlet 16 at a temperature of about 129 C. and a pressure of about 6 to 8 bar. The solution may preferably contain about 55 weight % solids. The horizontal cross-section available for downward fluid flow through each of the bundles 26, 28 and 30 is approximately 15 square meters.

The pressure drop across the upper distributor 52 may be about 3 to 5 bars and the total pressure drop across bundles 26, 28 and 30 may be about 2 bars. The pressure drop across the lower distributor 58 may be about 0.2 bar. The pressure in flash chamber 52 may desirably be maintained at less than about 0.1 bar.

The service fluid, which desirably may be hot oil, may be introduced into inlets 46 at a temperature of about 330 C., a pressure of about 3 bars, and a flow rate of about 120 gpm. The service fluid may leave outlets 48 at a temperature of about 289 C. and a pressure of about 1 bar.

The residence time of the polymer solution in the chamber 14 may be about 35 seconds and the polymer strands 60 leaving the chamber 14 to enter the flash chamber 62 may be at a temperature of about 185 C. and may have a solids content of about 96%.

More broadly, the invention may be useful in connection with the devolatization of any sort of polymer which is soluble in a solvent. For example, styrene acryonitrile, polystyrene and polyethylene may all be devolatilized using the principles and concepts of the invention. Hexane and other organic solvents may be used as the solvent. Desirably, the incoming polymer/solvent solution may contain from about 50 to about 80% solids by weight, may have a viscosity of from about 1 to about 100 Pa s, may have a temperature of from about 120 to about 160 C., and a flow rate of up to 50,000 pounds per hour of polymeric solids. The polymer leaving the preheater of the invention may have a temperature of from about 150 to about 280 C. after flashing and a viscosity of from about 1 to about 5000 Pa s.

The service fluid may, for example, be hot oil, hot water or steam at a temperature of from about 200 to 350 C. Preferably, the residence time of the polymer in the preheater chamber may be less than 2 minutes, and ideally may be less than about 50 seconds. The total pressure drop through the preheater may desirably be less than about 5 bar.

In accordance with the invention, a polymer/solvent solution may be processed for removal of solvent, unreacted monomer and low molecular weight oligomers under conditions whereby both pressure drop and degeneration of polymeric product are minimized.

We claim:

1. A polymer devolatilization preheater comprising:
   an elongated, upright hollow vessel defining a heating chamber having an upper end, a lower end, and a longitudinal axis extending between said ends, said vessel including an inlet for a polymer/solvent solution located adjacent said upper end of said chamber and a molten polymer outlet located adjacent said lower end of said chamber; and
   at least one heating tube bundle in said chamber, said bundle including at least one elongated serpentine heating tube arranged in a configuration having a major axis which extends across said chamber in a direction transverse to said longitudinal axis, said tube being positioned such that said polymer/solvent solution comes into heat transferring contact with an outer surface thereof as the polymer/solvent solution flows along a path that extends along said longitudinal axis from said polymer/solvent solution inlet toward said polymer outlet, said tube comprising a plurality of curved tube portions and a plurality of linking tube portions which interconnect said curved tube portions.

2. A polymer devolatilization preheater as set forth in claim 1, wherein said curved tube portions are arranged in a common plane.

3. A polymer devolatilization preheater as set forth in claim 1, wherein said linking tube portions are arranged in a common plane.

4. A polymer devolatilization preheater as set forth in claim 2, wherein said linking tube portions are arranged in said common plane.

5. A polymer devolatilization preheater as set forth in claim 4, wherein said plane is arranged in essential parallelism relative to said longitudinal axis.

6. A polymer devolatilization preheater as set forth in claim 1, wherein said configuration is essentially rectangular and presents a pair of opposite edges disposed in essential parallelism relative to said major axis.

7. A polymer devolatilization preheater as set forth in claim 4, wherein said configuration is essentially rectangular and presents a pair of opposite edges disposed in essential parallelism relative to said major axis.

8. A polymer devolatilization preheater as set forth in claim 7, wherein said linking tube portions are arranged in essential parallelism relative to one another.

9. A polymer devolatilization preheater as set forth in claim 7, wherein said linking tube portions are elongated and arranged so as to extend transversely relative to said major axis.

10. A polymer devolatilization preheater as set forth in claim 5, wherein said configuration is essentially rectangular and presents a pair of opposite edges disposed in essential parallelism relative to said major axis.

11. A polymer devolatilization preheater as set forth in claim 10, wherein said linking tube portions are arranged in essential parallelism relative to one another.

12. A polymer devolatilization preheater as set forth in claim 10, wherein said linking tube portions are elongated and arranged so as to extend transversely relative to said major axis.

13. A polymer devolatilization preheater as set forth in claim 4, wherein said bundle includes at least two of said tubes, said tubes being being arranged in respective adjacent parallel planes.

14. A polymer devolatilization preheater as set forth in claim 13, wherein said tubes have respective heating media inlets and outlets which project through a wall of said vessel, said tubes being arranged such that the heating media inlet of one of said tubes is adjacent the heating media outlet of the other tube and vice versa, whereby heating media introduced into the heating media inlets of said tubes flows through the tubes in opposite directions.

15. A polymer devolatilization preheater as set forth in claim 1, wherein is included at least two of said bundles in said chamber, one of said bundles being disposed above the other of said bundles, said bundles being oriented such that the major axis of the at least one elongated serpentine heating tube of said one of the bundles is offset angularly of said longitudinal axis relative to the major axis of the at least one elongated serpentine heating tube of the other of the bundles.

16. A polymer devolatilization preheater as set forth in claim 1, wherein said vessel and thereby said chamber have a rectangular horizontal cross-sectional configuration.

17. A polymer devolatilization preheater as set forth in claim 1, wherein is included an inlet distributor located at said upper end of the chamber for evenly distributing the flow of said polymer/solvent solution across an upper portion of said bundle.

18. A polymer devolatilization preheater as set forth in claim 1, wherein is included an outlet distributor located at said lower end of the chamber, said outlet distributor including a plurality of apertures for dividing said molten polymer into a multiplicity of strands as it leaves said chamber.

19. A method for preheating a polymer/solvent solution prior to introduction of the same into a vacuum devolatilization chamber comprising:

introducing a polymer/solvent solution into the polymer/solvent solution inlet preheater of claim 1 through the polymer/solvent solution inlet thereof;

heating the solution by allowing the same to descend or ascend through said chamber and contact said outer surface of the elongated serpentine heating tube; and recovering a heated, molten plastic at the molten polymer outlet.

20. A method for preheating and devolatilizing a polymer/solvent solution comprising:

introducing a polymer/solvent solution into the polymer/solvent solution inlet preheater of claim 1 through the polymer/solvent solution inlet thereof;

heating the solution and at least partially devolatilizing the polymer by allowing the solution to descend or ascend through said chamber and contact said outer surface of the elongated serpentine heating tube; and directing the heated and at least partially devolatilized polymer through said molten polymer outlet and into a vacuum devolatilization chamber.

21. A method as set forth in claim 20, wherein said molten polymer is divided into a multiplicity of individual strands before the same is directed into said devolatilization chamber.

22. A method for preheating a polymer/solvent solution prior to introduction of the same into a vacuum devolatilization chamber comprising:

introducing a polymer/solvent solution into the polymer/solvent solution inlet preheater of claim 5 through the polymer/solvent solution inlet thereof;

heating the solution by allowing the same to descend or ascend through said chamber and contact said outer surface of the elongated serpentine heating tube; and recovering a heated, molten plastic at the molten polymer outlet.

23. A method for preheating and devolatilizing a polymer/solvent solution comprising:

introducing a polymer/solvent solution into the polymer/solvent solution inlet preheater of claim 5 through the polymer/solvent solution inlet thereof;

heating the solution and at least partially devolatilizing the polymer by allowing the solution to descend or ascend through said chamber and contact said outer surface of the elongated serpentine heating tube; and directing the heated and at least partially devolatilized polymer through said molten polymer outlet and into a vacuum devolatilization chamber.

24. A method as set forth in claim 23, wherein said molten polymer is divided into a multiplicity of individual strands before the same is directed into said devolatilization chamber.

25. A method for preheating a polymer/solvent solution prior to introduction of the same into a vacuum devolatilization chamber comprising:

introducing a polymer/solvent solution into the polymer/solvent solution inlet preheater of claim 10 through the polymer/solvent solution inlet thereof;

heating the solution by allowing the same to descend or ascend through said chamber and contact said outer surface of the elongated serpentine heating tube; and recovering a heated, molten plastic at the molten polymer outlet.

26. A method for preheating and devolatilizing a polymer/solvent solution comprising:

introducing a polymer/solvent solution into the polymer/solvent solution inlet preheater of claim 10 through the polymer/solvent solution inlet thereof;

heating the solution and at least partially devolatilizing the polymer by allowing the solution to descend or ascend through said chamber and contact said outer surface of the elongated serpentine heating tube; and directing the heated and at least partially devolatilized polymer through said molten polymer outlet and into a vacuum devolatilization chamber.

27. A method as set forth in claim 26, wherein said molten polymer is divided into a multiplicity of individual strands before the same is directed into said devolatilization chamber.

28. A polymer devolatilization preheater comprising:

an elongated, upright hollow vessel defining a heating chamber having an upper end, a lower end, and a longitudinal axis extending between said ends, said vessel including an inlet for a polymer/solvent solution at one end thereof and a molten polymer outlet at the other end thereof; and at least one heating tube bundle in said chamber, said bundle including at least one elongated serpentine heating tube arranged in a configuration having a major axis which extends across said chamber in a direction transverse to said longitudinal axis, said tube being positioned such that said polymer/solvent solution comes into heat transferring contact with an outer surface thereof as the polymer/solvent solution flows along a path that extends generally along said longitudinal axis from said polymer/solvent solution inlet toward said polymer outlet, said tube comprising a plurality of curved tube portions and a plurality of linking tube portions which interconnect said curved tube portions.

29. A polymer devolatilization preheater as set forth in claim 28, wherein said inlet for a polymer/solvent solution is located adjacent the lower end of the chamber and said molten polymer outlet is located adjacent the upper end of the chamber.

30. A method for preheating a polymer/solvent solution prior to introduction of the same into a vacuum devolatilization chamber comprising:

introducing a polymer/solvent solution into the polymer/solvent solution inlet preheater of claim 28 through the polymer/solvent solution inlet thereof;

heating the solution by allowing the same to descend or ascend through said chamber and contact said outer surface of the elongated serpentine heating tube; and recovering a heated, molten plastic at the molten polymer outlet.

31. A method for preheating and devolatilizing a polymer/solvent solution comprising:

introducing a polymer/solvent solution into the polymer/solvent solution inlet preheater of claim 28 through the polymer/solvent solution inlet thereof;

heating the solution and at least partially devolatilizing the polymer by allowing the solution to descend or ascend through said chamber and contact said outer surface of the elongated serpentine heating tube; and directing the heated and at least partially devolatilized polymer through said molten polymer outlet and into a vacuum devolatilization chamber.

\* \* \* \* \*

UNITED STATES PATENT AND TRADEMARK OFFICE
CERTIFICATE OF CORRECTION

PATENT NO. : 6,479,624 B2
DATED : November 12, 2002
INVENTOR(S) : Angelia M. Wepener et al.

It is certified that error appears in the above-identified patent and that said Letters Patent is hereby corrected as shown below:

<u>Title page,</u>
Item [*] Notice, "Subject to any disclaimer, the term of this patents extended or adjusted under 35 U.S.C. 154(b) by 0 days." should read -- Subject to any disclaimer, the term of this patent is extended or adjusted under 35 U.S.C. 154(b) by 59 days. --

Signed and Sealed this

Eighth Day of March, 2005

JON W. DUDAS
*Director of the United States Patent and Trademark Office*